(12) United States Patent
Zhu et al.

(10) Patent No.: US 12,388,161 B2
(45) Date of Patent: Aug. 12, 2025

(54) BATTERY, BATTERY MODULE, BATTERY PACK AND ELECTRIC VEHICLE

(71) Applicant: BYD COMPANY LIMITED, Guangdong (CN)

(72) Inventors: Jianhua Zhu, Shenzhen (CN); Yan Zhu, Shenzhen (CN); Dongjun Deng, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 691 days.

(21) Appl. No.: 17/778,731

(22) PCT Filed: Nov. 18, 2020

(86) PCT No.: PCT/CN2020/129852
§ 371 (c)(1),
(2) Date: May 20, 2022

(87) PCT Pub. No.: WO2021/098739
PCT Pub. Date: May 27, 2021

(65) Prior Publication Data
US 2023/0017407 A1 Jan. 19, 2023

(30) Foreign Application Priority Data

Nov. 22, 2019 (CN) .......................... 201911171817.4

(51) Int. Cl.
*H01M 50/645* (2021.01)
*H01M 50/184* (2021.01)
(Continued)

(52) U.S. Cl.
CPC ....... *H01M 50/645* (2021.01); *H01M 50/184* (2021.01); *H01M 50/474* (2021.01);
(Continued)

(58) Field of Classification Search
CPC ............ H01M 50/609; H01M 50/618; H01M 50/627; H01M 50/636; H01M 50/645;
(Continued)

(56) References Cited

U.S. PATENT DOCUMENTS

2006/0166087 A1\* 7/2006 Ogata ............... H01M 10/0413
429/153
2017/0040575 A1 2/2017 Bang
2021/0126293 A1\* 4/2021 Wang .................. H01M 50/533

FOREIGN PATENT DOCUMENTS

CN 2852411 Y 12/2006
CN 102104167 A 6/2011
(Continued)

OTHER PUBLICATIONS

International Search Report and Written Opinion issued in Application No. PCT/CN2020/129852, mailed on Feb. 20, 2021, 13 pages.

*Primary Examiner* — Christopher P Domone

(57) ABSTRACT

A battery includes a housing, at least one end cover, partition plates, and electrode core assemblies. The at least one end cover is arranged on at least one of two opposite ends of the housing. The partition plates are spaced apart from each other in the housing for separating the internal space of the housing into accommodating cavities. Each electrode core assembly is arranged in an accommodating cavity. The electrode core assembly includes at least one electrode core. The electrode core assemblies are connected in series. The partition plate is provided with an electrolyte solution filling channel in communication with an accommodating cavity on at least one side of the partition plate. The electrolyte solution filling channel is closed upon completion of filling the electrolyte solution. A through hole is provided on the
(Continued)

partition plate at a position of the housing corresponding to the electrolyte solution filling channel.

20 Claims, 17 Drawing Sheets

(51) Int. Cl.
  *H01M 50/474* (2021.01)
  *H01M 50/51* (2021.01)
  *H01M 50/682* (2021.01)
(52) U.S. Cl.
  CPC ......... *H01M 50/51* (2021.01); *H01M 50/682* (2021.01); *H01M 2220/20* (2013.01)
(58) Field of Classification Search
  CPC ............. H01M 50/668; H01M 50/474; H01M 50/477; H01M 50/184; H01M 50/186; H01M 50/188
  See application file for complete search history.

(56) References Cited

FOREIGN PATENT DOCUMENTS

| | | |
|---|---|---|
| CN | 102403479 A | 4/2012 |
| CN | 102683755 A | 9/2012 |
| CN | 106025392 A | 10/2016 |
| CN | 106505169 A | 3/2017 |
| CN | 107230801 A | 10/2017 |
| CN | 110518156 A | 11/2019 |
| CN | 110518174 A | 11/2019 |
| CN | 211743203 U | 10/2020 |
| CN | 211743281 U | 10/2020 |
| EP | 1705731 A1 | 9/2006 |
| EP | 3113243 A1 | 1/2017 |
| JP | 2001057199 A | 2/2001 |
| JP | 2010080081 A | 4/2010 |
| JP | 2010153179 A | 7/2010 |
| JP | 2011129668 A | 6/2011 |

\* cited by examiner

BATTERY, BATTERY MODULE, BATTERY PACK AND ELECTRIC VEHICLE

CROSS-REFERENCE TO RELATED APPLICATIONS

This application is a National Phase Application of International Patent Application No. PCT/CN2020/129852, filed on Nov. 18, 2020, which is based on and claims priority to and benefits of Chinese Patent Application No. 201911171817.4, entitled "BATTERY, BATTERY MODULE, BATTERY PACK AND ELECTRIC VEHICLE" and filed on Nov. 22, 2019. The entire content of all of the above-identified applications is incorporated herein by reference.

FIELD

The present disclosure relates to the field of batteries, and more specifically, to a battery, a battery module, a battery pack, and an electric vehicle.

BACKGROUND

With the continuous popularization of new energy automobiles, increasingly high use requirements are imposed on power batteries of the new energy automobiles. In particular, users have requirements for the long mile range of the new energy automobiles. Therefore, power battery packs in the new energy automobiles need to have a high overall capacity. In addition, during the operation of a power battery pack, internal consumption caused by internal resistance is required to be minimized.

Generally, a housing of a battery is provided with only one bare battery core or a number of bare battery cores connected in parallel. However, the single bare battery core or the number of bare battery cores connected in parallel cannot increase the voltage of the entire battery. For example, a voltage of a lithium titanate battery is 2.4 volts, a voltage of a lithium iron phosphate battery is 3.2 volts, a voltage of a ternary battery is 3.7 volts, and a voltage of a multipolymer battery is 4.3 volts. Therefore, when a high voltage (a high capacity) is required, a number of cells need to be connected in series to form a battery module, and then the battery module is assembled into a power battery pack.

Existing new energy automobiles generally have a width greater than 1 meter and a length of a few meters. The power battery pack of the new energy automobile is generally arranged at the bottom of the new energy automobile. Currently, the power battery pack on the market generally has a width roughly the same as the width of the new energy automobile, which is greater than 1 meter. A length of the power battery pack is determined based on a reserved space at the bottom of the new energy automobile, which is generally greater than 2 meters. As a whole, both the length and the width of the power battery pack are greater than 1 meter. However, currently, the length of the battery on the market is generally about 0.3 meters. Therefore, at least three cells or even more need to be connected in series in each battery module. In addition, an external power connector needs to be arranged for power connection between two adjacent cells, resulting in a relatively large number of structural members of the battery. In this way, costs are increased, and the overall weight of the power battery pack is increased. In addition, the structural members occupy a relatively large internal space of the battery pack, resulting in a decrease in an overall capacity of the power battery pack. Therefore, the larger number of cells result in more space wasting. Moreover, a number of external power connectors need to be arranged for power connection, so that internal consumption of the power battery pack in use is increased with the increased internal resistance.

In order to resolve the above technical problems, some cells are also provided in related arts. A number of electrode core assemblies connected in series are arranged inside a housing of the battery, and two adjacent electrode core assemblies are separated by using a partition plate. In this way, the housing and external structural members can be reduced. Therefore, the space utilization of the battery pack is increased, the internal consumption of the battery pack in use is reduced, and the overall capacity of the power battery pack is ensured.

Since the number of electrode core assemblies are connected in series side by side, the potential difference inside the battery is relatively high. If the number of electrode core assemblies connected in series share electrolyte solution in a cavity, the electrolyte solution is highly likely to decompose due to the high potential difference, resulting in battery failure. In order to resolve the above problem, the partition plate in the above battery is arranged between the two adjacent electrode core assemblies, and the electrode core assemblies are separated in the respective cavities by the partition plates. Each cavity has an individual electrolyte solution. However, since the inside of the housing is separated into a number of individual cavities by the partition plates, technical problems of how to safely and effectively fill the electrolyte solution into each individual cavity and how to implement the sealing during the electrolyte solution filling while ensuring separation between the two adjacent cavities are urgently required to be resolved by those skilled in the art.

SUMMARY

The content of the present disclosure resolves at least one of the technical problems existing in related arts.

A first aspect of the present disclosure provides a battery, including a housing, end covers, partition plates, and a number of electrode core assemblies. The end covers are arranged on two opposite ends of the housing for sealing an internal space of the housing. The partition plates are spaced apart from each other in the housing for dividing the internal space of the housing into a number of accommodating cavities successively arranged along a first direction. Each electrode core assembly is arranged in each accommodating cavity. The number of electrode core assemblies are arranged along the first direction and connected in series. Each partition plate comprises an electrolyte solution filling channel. The electrolyte solution filling channel is in communication with the accommodating cavity on at least one side of the partition plate, and is configured for filling electrolyte solution into the accommodating cavity from an outside of the battery. The electrolyte solution filling channel is in a closed state upon completion of filling the electrolyte solution to prevent communication between the accommodating cavity and the outside of the battery. A through hole is provided at a position of the housing corresponding to the electrolyte solution filling channel on the partition plate, and is configured to communicate the electrolyte solution filling channel with the outside of the battery.

A second aspect of the present disclosure provides a battery module, including the battery.

A third aspect of the present disclosure provides a battery pack, including the battery or the battery module.

A fourth aspect of the present disclosure provides an electric vehicle, including the battery pack, the battery module, or the battery.

According to the battery provided in the present disclosure, the partition plates are arranged inside the housing to separate the number of sealed accommodating cavities to accommodate the number of electrode core assemblies, and the number of electrode core assemblies are connected in series. In this way, the battery can have a higher battery capacity and voltage. Therefore, the overall capacity and voltage of the battery pack can be enhanced, and the endurance capacity of the electric vehicle can be improved. In addition, the electrolyte solution filling channel is provided on the partition plates, and the through holes are provided at the position of the housing corresponding to the electrolyte solution filling channel on the partition plate. In this way, the electrolyte solution may be filled into each individual accommodating cavity after the battery is assembled. Therefore, the problem of the electrolyte solution filling of the battery including the number of electrode core assemblies connected in series is effectively resolved.

Additional aspects and advantages of the present disclosure will be given in the following description, some of which will become apparent from the following description or may be learned from practices of the present disclosure.

LIST OF REFERENCE NUMERALS

Figure 1:
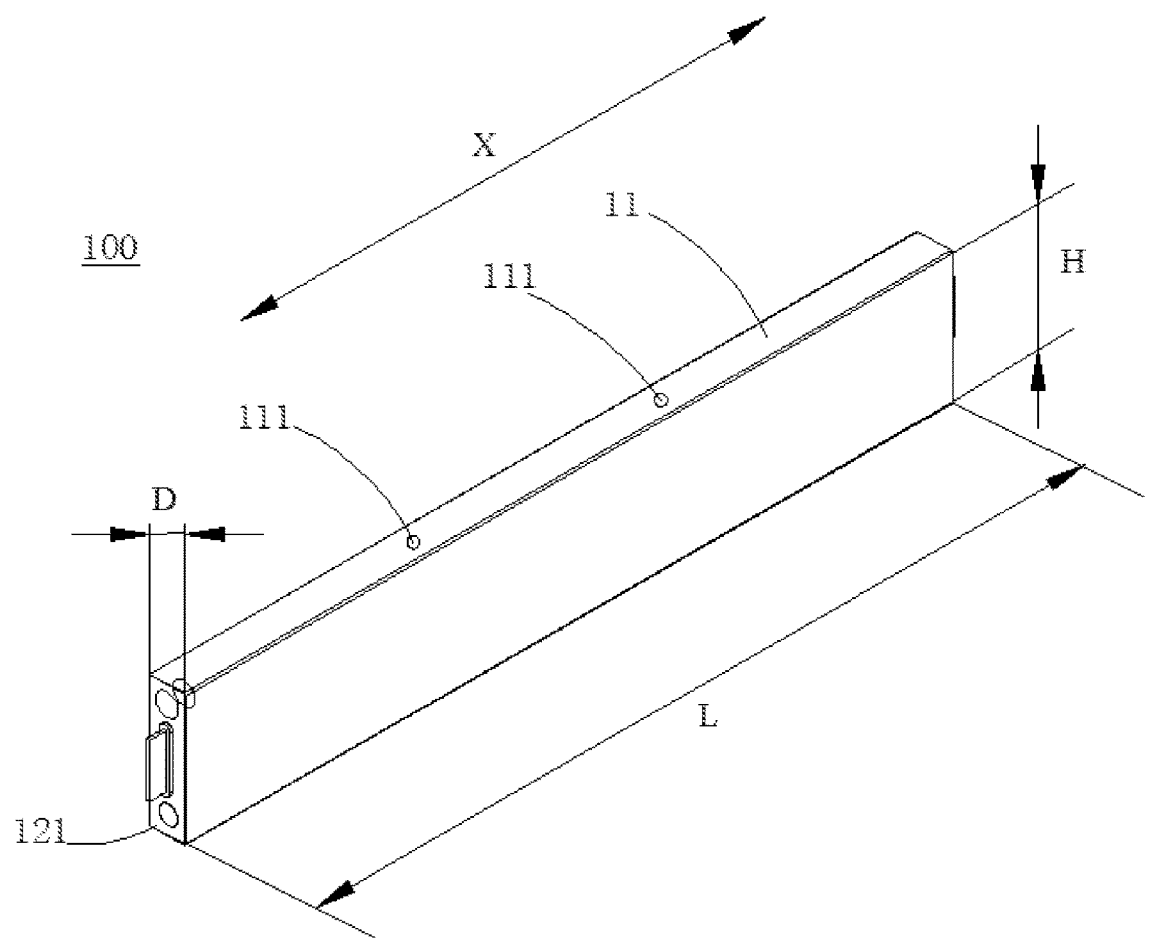
FIG. 1 is a schematic diagram of an overall structure of a battery according to an embodiment of the present disclosure.

Battery 100;

Housing 11; Through hole 111, 1122; Separator film 112; Sub-separator film 1121; End cover 121; Partition plate 122; Through connecting hole 123; Packaging structure 124; Side surface 125; Circumferential surface 126; Electrode core assembly 13; First electrode lead-out member 131; Second electrode lead-out member 132; Accommodating cavity 14; Electrode core connector 15; Copper connection piece 151; Aluminum connection piece 152; Electrolyte solution filling channel 16; Liquid inlet 161; Liquid outlet 162; First channel 163; Second channel 164; Third channel 165; Fourth channel 166; Blocking member 17; Electrolyte solution guide hole 18; Sealing member 19; Sealing ring 191; Metal ball 192; Sealing sleeve 193; Sealing channel 20; Pallet 50;

Battery module 200; Battery pack 300; and

Electric vehicle 1000.

The following implementations are combined with the foregoing accompanying drawings to further describe the present disclosure.

DETAILED DESCRIPTION

The following describes embodiments of the present disclosure in detail. Examples of the embodiments are shown in the accompanying drawings, and same or similar reference signs in all the accompanying drawings indicate same or similar components or components having same or similar functions. The embodiments described below with reference to the accompanying drawings are exemplary and used only for explaining the present disclosure, and should not be construed as a limitation on the present disclosure.

In the description of the present disclosure, it should be understood that orientation or position relationships indicated by the terms such as "center", "longitudinal", "transverse", "length", "width", "thickness", "on", "below", "front", "back", "left", "right", "vertical", "horizontal", "top", "bottom", "inside", "outside", "axial direction", "radial direction", and "circumferential direction" are based on orientation or position relationships shown in the accompanying drawings, and are used only for ease and brevity of illustration and description, rather than indicating or implying that the disclosed apparatus or component must have a particular orientation or must be constructed and operated in a particular orientation. Therefore, such terms should not be construed as limiting of the present disclosure.

In the present disclosure, unless otherwise explicitly specified or defined, the terms such as "install", "connect", "connection", and "fix" should be understood in a broad sense. For example, the connection may be a fixed connection, a detachable connection, or an integral connection; or the connection may be a mechanical connection or an electrical connection; a direct connection, an indirect connection through an intermediate, or internal communication between two elements or an interaction relationship between two elements. A person of ordinary skill in the art may understand the specific meanings of the foregoing terms in the present disclosure according to specific situations.

Figure 2:
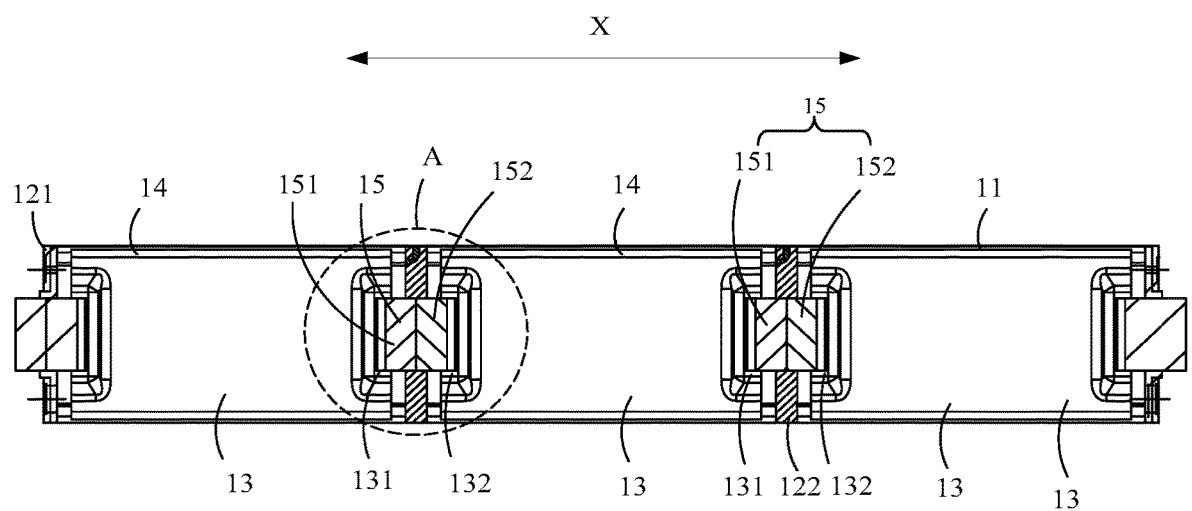
FIG. 2 is a cross-sectional view of the battery shown in FIG. 1.

As shown in FIG. 1 and FIG. 2, the present disclosure provides a battery 100. The battery 100 includes a housing 11, end covers 121, partition plates 122, and a number of electrode core assemblies 13. The end covers 121 are arranged on two opposite ends of the housing 11 for sealing an internal space of the housing 11. The partition plates 122 are spaced apart from each other in the housing 11 for dividing the internal space of the housing 11 into a number of accommodating cavities 14 successively arranged along a first direction. For example, the first direction is an X direction shown in FIG. 1.

In the present disclosure, the internal space of the housing 11 is divided into the number of accommodating cavities 14 that are successively arranged along the first direction. The partition plates 122 may divide the housing 11 into a number of parts inside the housing 11, so as to form the number of accommodating cavities 14. Alternatively, the partition plates 122 are arranged in the housing 11, and divide one space arranged in the housing 11 into the number of accommodating cavities 14. Contents of this section are to be specifically described below.

In this implementation, the battery 100 may be a lithium-ion battery. The first direction is a length direction of the battery 100. The housing 11 is configured to enhance the strength of the battery 100 to guarantee the safe use of the battery 100. The housing may be a plastic housing or a metal housing. When the housing is the metal housing, the housing has a desirable heat dissipation performance and a high strength, and may have a function of supporting itself.

In this implementation, each electrode core assembly 13 is arranged in each accommodating cavity 14. The electrode core assembly 13 includes at least one electrode core. The number of electrode core assemblies 13 are successively arranged along the first direction and connected in series.

In this implementation, one electrode core assembly 13 is arranged in each accommodating cavity 14. The electrode core assemblies 13 in two adjacent accommodating cavities 14 are connected in series. Therefore, the number of electrode core assemblies 13 are successively connected in series. In other implementations, the number of electrode core assemblies 13 may also be arranged side by side in the accommodating cavity 14, for example, two or more than two electrode core assemblies.

The electrode core disclosed in the present disclosure is an electrode core commonly used in the field of power batteries. The electrode core and the electrode core assemblies 13 are internal components of the housing 11 of the battery 100, but cannot be understood as the battery 100 itself. The electrode core may be formed by winding or lamination. Generally, the electrode core includes at least a positive plate, a separator, a negative plate, and electrolyte solution. The electrode core is usually a module that is not completely sealed. Therefore, the battery 100 disclosed in the present disclosure is a single cell, which shall not be simply understood as a battery module because the battery includes a number of electrode cores. In the present disclosure, the electrode core assembly 13 may include an independent electrode core, or may include at least two electrode cores. The electrode core assembly 13 is formed after the at least two electrode cores are connected in parallel.

In the present disclosure, the number of electrode core assemblies 13 are connected in series, thereby achieving a high capacity and a high voltage of the battery 100, simplifying the manufacturing process, and reducing costs.

Generally, a number of the series-connected electrode core assemblies included in the battery 100 may be determined according to an output voltage of each electrode core assembly 13, a width of the used battery pack, and an overall voltage requirement of the battery pack. For example, for a vehicle model, a battery system is required to output a voltage of 300 V, and a voltage of a conventional lithium-iron battery is 3.2 V. Therefore, in related arts, 100 batteries are required to be connected in series in the pack to meet the requirements. In the battery pack in the present disclosure, assuming that 2 electrode core assemblies 13 are connected in series in the battery, it is only necessary to arrange 50 batteries 100. By analogy, if 10 electrode core assemblies 13 are connected in series, it is only necessary to connect 10 batteries 100 in series. In this way, the design of the whole pack and the arrangement of cells are greatly simplified, which can effectively use the space and enhance the space utilization.

In related arts, in order to realize the high capacity and the high voltage of the battery, it is generally necessary to connect two or more than two cells in series. However, power connections between end covers of respective end portions and an external power connector is required at a junction between two adjacent cells connected in series, resulting in a relatively large number of structural members of the battery, which not only increases costs, but also increases the overall weight of the power battery pack. In addition, the structural members occupy a relatively large internal space of the battery pack, resulting in a decrease in an overall capacity of the power battery pack. In addition, a number of external power connectors need to be arranged for power connection, so that internal consumption of the power battery pack in use is increased with the increased internal resistance.

Compared with related arts, in the present disclosure, the partition plates 122 are spaced apart from each other in the housing 11 to separate the number of accommodating cavities 14 side by side inside the housing 11. The electrode core assembly 13 is arranged in each accommodating cavity 14. The electrode core assemblies 13 in the accommodating cavities 14 are connected in series. In this way, the capacity and the voltage of the battery 100 can be effectively increased. In addition, two adjacent accommodating cavities 14 are communicated by one partition plate 122 in a sealed manner. In this way, a structural member of the battery 100 may be simplified, a spacing between the two adjacent electrode core assemblies 13 may be decreased, and internal consumption of the power battery pack is reduced. Therefore, the battery pack may have a larger internal space to accommodate cells, thereby increasing the overall capacity and the voltage of the battery pack, and improving the endurance capacity of an electric vehicle 1000 using the battery pack.

In this implementation, lengths of the housing 11 and the electrode core assemblies 13 both extend along the first direction. The housing 11 is an integrated structure extending along the first direction.

In the present disclosure, as shown in FIG. 1, the battery 100 is generally a cuboid. The battery 100 has a length L, a width H, and a thickness D. The length L of the battery 100 is greater than the width H, and the width H of the battery 100 is greater than the thickness D. The length of the battery 100 may range from 400 mm to 2500 mm. In the present disclosure, a ratio of the length L to the width H of the battery 100 is L/H=4~21.

It is to be noted that the battery 100 being generally a cuboid may be understood that, the battery 100 may be in a shape of a cuboid or a cube, or partially special-shaped but substantially in the shape of the cuboid or the cube, or has a notch, a protrusion, a chamfer, a camber, or a crook in part, but is in the shape similar to the cuboid or the cube as a whole.

In related arts, in order to increase the volume utilization of the battery pack, a size of the battery is set to be in a range of 400 mm to 2500 mm. Since the battery is too long, the internal resistance of the battery is too high if only one electrode core is arranged. As a result, a potential difference between a positive electrode and a negative electrode is excessively large, resulting in the electrolyte solution unable to work properly. According to the technical solution of the present disclosure, the battery having the length ranging from 400 mm to 2500 mm can be manufactured conveniently, and the internal resistance and the connection between structural components can be reduced, thereby further reducing the costs.

Figure 3:
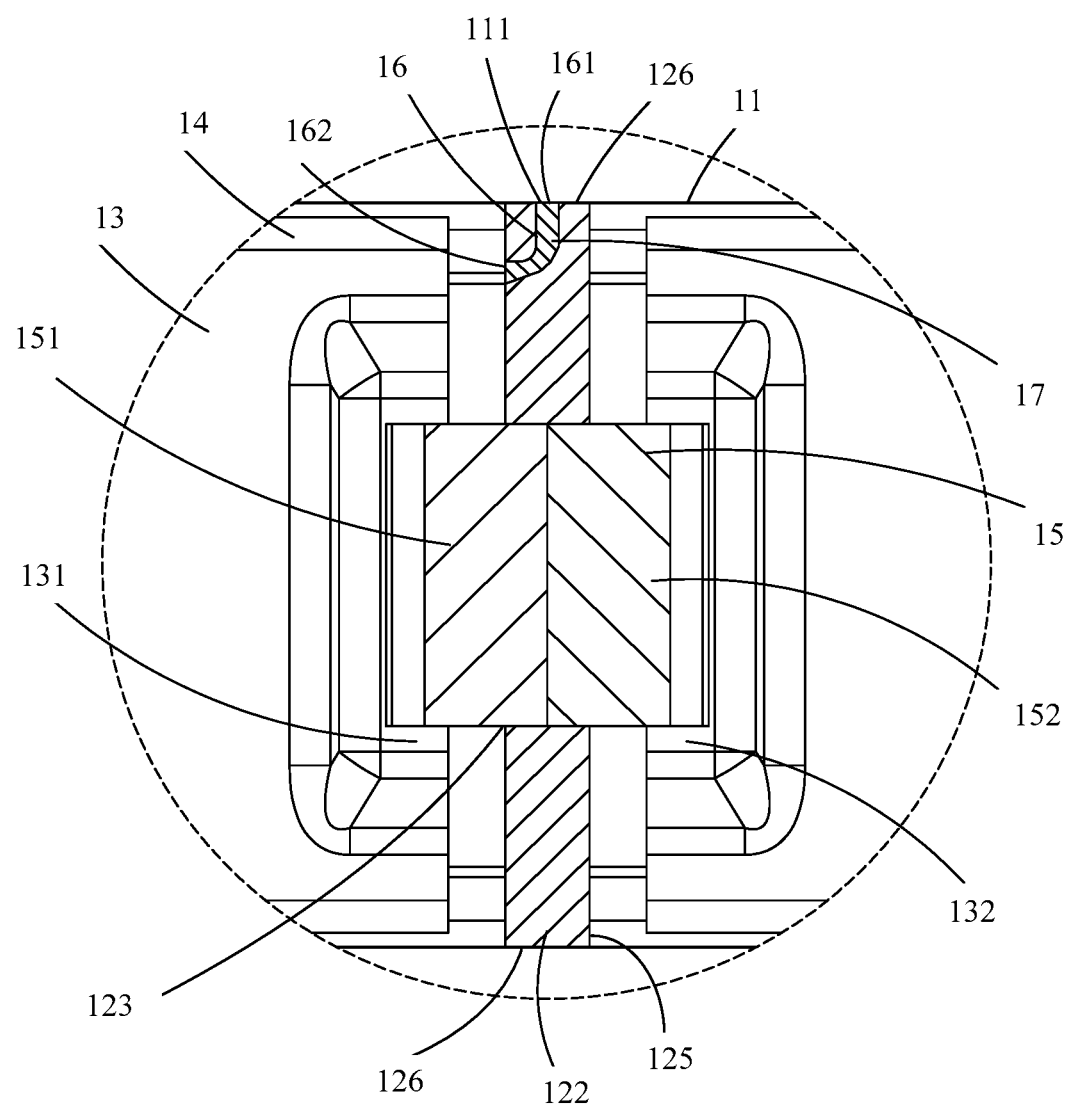
FIG. 3 is a partial enlarged view of part A in FIG. 2.

As shown in FIG. 3, the partition plate 122 includes a side surface 125 facing the adjacent electrode core assemblies 13 and a circumferential surface 126 connected with the side surface 125. The circumferential surface 126 of the partition plate 122 is coupled with the housing 11 to divide the internal space of the housing 11 into the number of accommodating cavities 14.

In an implementation, referring to FIG. 2 again, a cavity wall of the accommodating cavity 14 among the number of accommodating cavities 14 on each of two ends of the battery 100 in the first direction includes the partition plate 122 and the end cover 121 that are arranged on the end portions of the accommodating cavity 14, and a portion of the housing 11 arranged between the partition plate 122 and the end cover 121. A cavity wall of the accommodating cavity 14 among the number of accommodating cavities 14 arranged in the middle of the battery 100 in the first direction includes two adjacent partition plates 122 arranged on end portions of the accommodating cavity 14 and a portion of the housing 11 arranged between the two adjacent partition plates 122. That is to say, the partition plates 122 divide the housing 11 into a number of parts in the housing 11, so as to form the number of accommodating cavities 14.

In the present disclosure, when the number of electrode core assemblies 13 are connected in series, an internal short circuit may occur in a case that the electrolyte solution in different electrode core assemblies 13 are communicated with each other, and a potential difference (by using a lithium iron phosphate battery as an example, a potential difference ranges from 4.0 V to 7.6 V) among different electrode core assemblies 13 is relatively large. In this way, the electrolyte solution in the electrode core assemblies may be decomposed due to the large potential difference, which affects the performance of the battery. In order to better achieve the function of insulation, the partition plate 122 may be made of an insulation material. That is to say, the partition plates 122 are insulating partition plates. Therefore, the partition plates 122 may be directly used to isolate the two adjacent electrode core assemblies 13 to maintain the insulation between the electrode core assemblies without performing other operations. The housing 11 may be a metal housing having an insulated inner surface.

Figure 4:
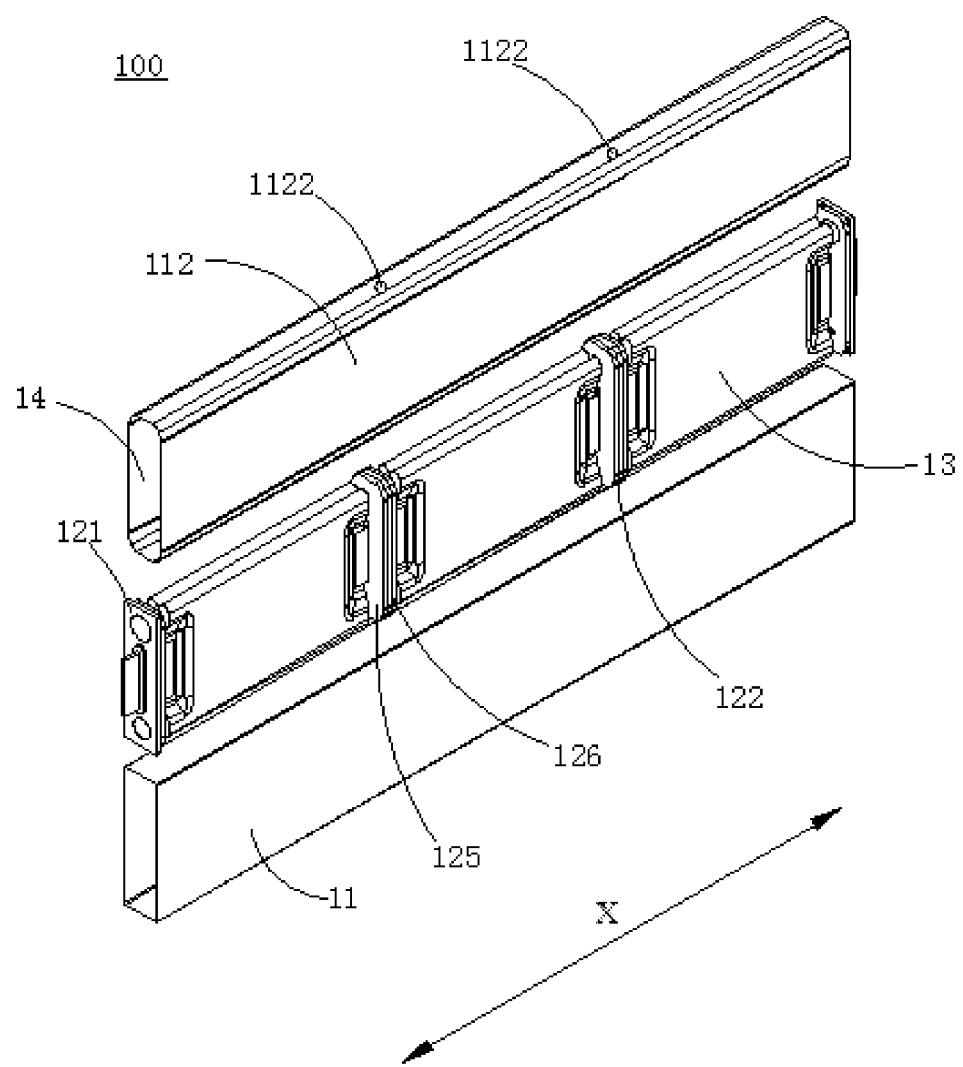
FIG. 4 is a structural exploded view of a battery according to another embodiment of the present disclosure.

In another implementation, as shown in FIG. 4, the battery 100 further includes a separator film 112 arranged in the housing 11. The partition plates 122 are spaced apart from each other in the separator film 112. The circumferential surfaces 126 of the partition plates 122 are coupled with the separator film 112 to divide an internal space of the separator film 112 into a number of accommodating cavities 14. That is to say, the separator film 112 is an integrated film. The partition plates 122 are arranged in the separator film 112, and divide a receiving space of the separator film 112 into the number of accommodating cavities 14.

In this implementation, the number of partition plates 122 are arranged in the housing 22 of the battery 100, to divide the space in the housing 22 into the number of accommodating cavities 14 spaced apart from each other along the first direction. The cavity wall of the accommodating cavity 14 among the number of accommodating cavities 14 on each of two ends of the battery 100 in the first direction includes the partition plate 122 and the end cover 121 arranged on the end portion of the accommodating cavity 14, and a portion of the separator film 112 arranged between the partition plate 122 and the end cover 121. In addition, the cavity wall of the accommodating cavity 14 among the number of accommodating cavities 14 arranged in the middle of the battery 100 in the first direction includes two adjacent partition plates 122 arranged on the end portions of the accommodating cavity 14 and a portion of the separator film 112 arranged between the two adjacent partition plates 122.

Figure 5:
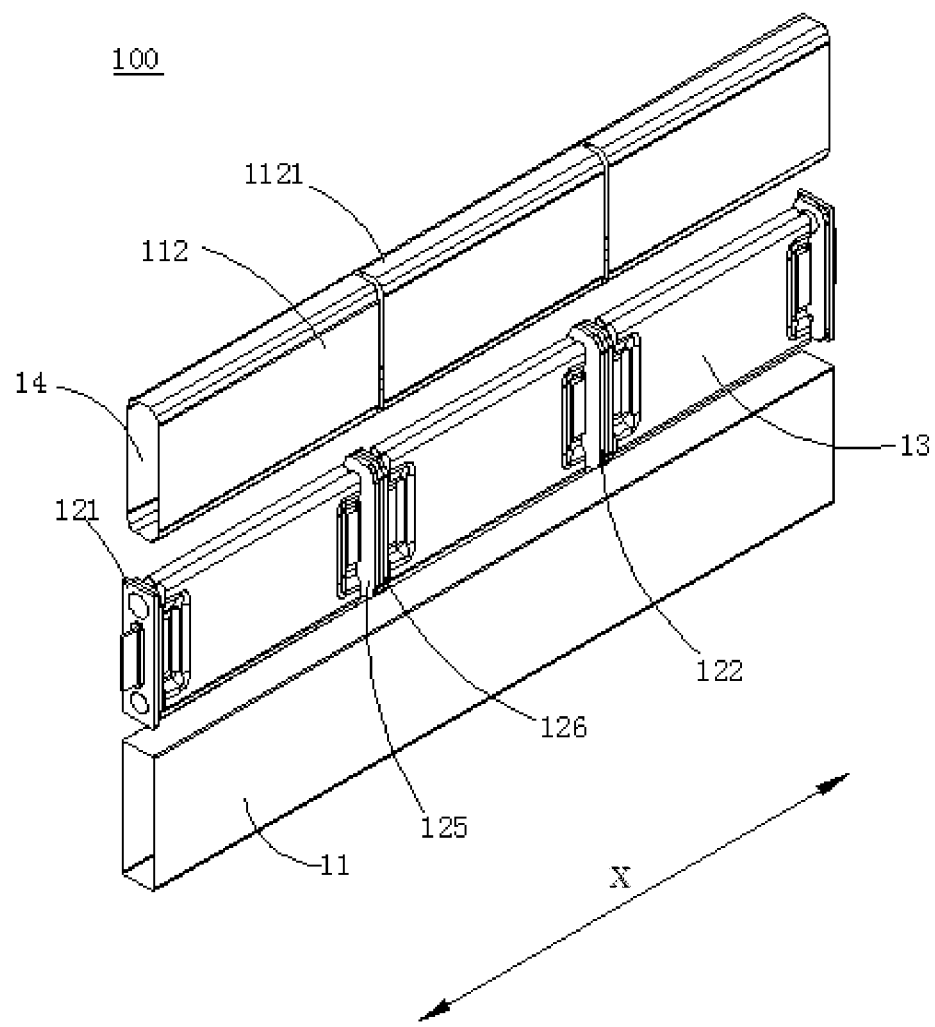
FIG. 5 is a structural exploded view of a battery according to another embodiment of the present disclosure.

In another implementation, as shown in FIG. 5, the battery 100 further includes the separator film 112 arranged inside the housing 11. The separator film 112 includes a number of sub-separator films 1121 arranged along the first direction and in a one-to-one correspondence with the number of accommodating cavities 14. Two opposite ends of each sub-separator film 1121 are coupled with the partition plates 122 on two ends of the corresponding accommodating cavity 14, or the partition plates 122 are coupled with the end covers 121 to form the corresponding accommodating cavity 14. Two adjacent accommodating cavities 14 share one partition plate 122.

In this implementation, the number of partition plates 122 are arranged in the housing 22 of the battery 100, to divide the space in the housing 22 into the number of accommodating cavities 14 spaced apart from each other along the first direction. The cavity wall of the accommodating cavity 14 among the number of accommodating cavities 14 arranged in the middle of the battery 100 in the first direction includes the corresponding sub-separator film 1121 and two partition plates 122 arranged on end portions of the corresponding sub-separator film 1121. The cavity wall of the accommodating cavity 14 among the number of accommodating cavities 14 arranged on each of the two ends of the battery 100 in the first direction includes the corresponding sub-separator films 1121 and the partition plate 122 and the end cover 121 that are arranged on the end portions of the corresponding sub-separator film 1121.

The number of sub-separator films 1121 are a number of independent parts separated from each other. That is to say, the separator film 112 is a separated-type separator film. Each sub-separator film 1121 is a cylindrical structure having two open ends. The electrode core assemblies 13 are arranged inside the cylindrical sub-separator film 1121. The partition plates 122 or the end covers 121 seal the open ends of the corresponding separator film 112.

In the present disclosure, a manner in which the separator film 112 is sealed to the partition plates 122 or the end covers 121 and a specific structure are not specially limited. For example, when the partition plate 122 or the end cover 121 is made of a plastic material, and the separator film 112 is made of plastic, the separator film 112 may be sealed to the partition plates 122 or the end covers 121 by hot melting.

In the present disclosure, the number of electrode core assemblies 13 are connected in series. Different voltages among different electrode core assemblies 13 may cause an excessively low local potential of the housing such as an aluminum housing. At this point, lithium ions may be easily embedded in the housing to form an aluminum-lithium alloy and corrode the aluminum housing. In the present disclosure, the separator film 112 is arranged between the housing 11 and the electrode core assembly 13, so as to effectively prevent contact between the electrolyte solution and the housing 11.

The separator film 112 has a certain insulating property and a resistance to electrolyte solution corrosion. A material of the separator film 112 is not specially limited, as long as the material has the insulating property and does not react with the electrolyte solution. In some embodiments, the material of the separator film 112 may include polypropylene (PP), polyethylene (PE), or a multilayer composite film. For example, in some embodiments, the multilayer composite film includes an inner layer, an outer layer, and a middle layer between the inner layer and the outer layer. The inner layer includes the plastic material. For example, the inner layer may be made of a material that is less reactive with the electrolyte solution in the separator film 112 and has the insulating property, for example, PP or PE. The middle layer includes a metal material, so as to prevent permeation of water vapor outside the battery 100 and also prevent the leakage of the electrolyte solution inside the battery. An aluminum foil, a stainless steel foil, a copper foil, and the like are preferably used as the metal layer. The outer layer is a protective layer, which is usually made of polyester having a high melting point or a nylon material, and has a strong mechanical property. In this way, an external force is prevented from damaging the battery 100, thereby protecting the battery 100. In some implementations, the separator film 112 further has a certain flexibility, which facilitates the molding and machining of the battery 100 and prevents the battery from being pierced.

In the present disclosure, in order to fill the electrolyte solution into the accommodating cavities 14 where the electrode core assemblies 13 are arranged, as shown in FIG. 3, the partition plate 122 is provided with an electrolyte solution filling channel 16. The electrolyte solution filling channel 16 is in communication with the accommodating cavity 14 on at least one side of the partition plate 122, and is configured for filling the electrolyte solution into the accommodating cavity 14 from an outside of the battery 100. The electrolyte solution filling channel 16 is in a closed state upon completion of the electrolyte solution filling, to prevent communication between the accommodating cavity 14 and the outside of the battery 100. It may be understood that the electrolyte solution filling channel 16 may also be provided on the end cover for the communication with the accommodating cavity 14 on one side of the end cover 121 according to actual conditions.

Two ends of the electrolyte solution filling channel 16 are respectively formed as a liquid inlet 161 and a liquid outlet 162. The liquid inlet 161 is arranged on the circumferential surface 126 of the partition plate 122 where the liquid inlet is arranged. The liquid outlet 162 is arranged on the side surface 125 of the partition plate 122 where the liquid outlet is arranged. The electrolyte solution is filled into the electrolyte solution filling channel 16 through the liquid inlet 161, and filled into the accommodating cavity 14 through the liquid outlet 162.

In the present disclosure, a shape of the electrolyte solution filling channel 16 may be flexibly configured. For example, the electrolyte solution filling channel may be an arcuate or curved cylindrical channel, or may be an L-shaped channel.

Referring to FIG. 1 and FIG. 3 again, in this implementation, a through hole 111 is provided at a position of the housing 11 corresponding to the electrolyte solution filling channel 16 on the partition plate 122. The through hole 111 is configured to communicate the electrolyte solution filling channel 16 with the outside of the battery 100.

It may be understood that, when the integrated separator film 112 is arranged in the housing 11, as shown in FIG. 4, a through hole 1122 is also provided at a position of the separator film 112 corresponding to the electrolyte solution filling channel 16 on the partition plate 122. The through hole 1122 is configured to communicate the electrolyte solution filling channel 16 with the outside of the battery 100.

In the present disclosure, the through holes are provided on the housing 11 of the battery 100 or at the positions of the housing 11 and the separator film 112 corresponding to the electrolyte solution filling channel 16 on the partition plate 122. In this way, the electrolyte solution may be filled into each individual accommodating cavity 14 after the battery 100 is assembled. Therefore, the problem such as the electrolyte solution filling of the battery including the number of electrode core assemblies connected in series is effectively resolved.

It may be understood that, after the electrolyte solution is filled into the accommodating cavity 14, the electrolyte solution filling channel 16 is required to be sealed. In an implementation, as shown in FIG. 3, the battery 100 further includes a blocking member 17. The blocking member 17 is configured to seal the electrolyte solution filling channel 16 upon completion of the electrolyte solution filling. At least part of the blocking member 17 may be arranged in the electrolyte solution filling channel 16.

In another implementation, a protrusion may protrude outward from the partition plate 122 and is made of plastic. The liquid inlet 161 is arranged on the protrusion. The liquid inlet 161 is sealed by hot melting upon completion of the electrolyte solution filling.

In the present disclosure, two adjacent housings 11 are sealed to each other by using the partition plate 122. The electrolyte solution filling channel 16 is provided on the partition plate 122. In this way, once the electrolyte solution in one of the accommodating cavities 14 leaks, other accommodating cavities 14 remain intact. Therefore, the safety problem caused by the leakage of the electrolyte solution will not occur. Upon completion of the electrolyte solution filling, the electrolyte solution filling channel 16 on the partition plate 122 of the cavity wall of the accommodating cavity 14 is in a sealed state. Therefore, on the one hand, the electrolyte solution in the accommodating cavity 14 does not flow out from the accommodating cavity 14 to contact with the housing 11 to cause an internal short circuit. On the other hand, the electrolyte solution does not flow between adjacent accommodating cavities 14, which does not affect each other, and is not decomposed due to the excessively large potential difference, thereby ensuring the safety and the service life of the battery 100.

In the field of power batteries, the consistency of working conditions of cells is very important, which directly affects the performance of the entire battery pack. Similarly, the consistency of working conditions of the electrode core assemblies in the battery will also affect the overall performance of each cell, and affect the performance of the entire battery pack. However, an amount of the electrolyte solution inside the battery will affect the performance of the battery, such as a capacity, an activity, and the like. In the present disclosure, when it is ensured that the electrolyte solution can timely and effectively infiltrate the electrode core assemblies, providing the electrolyte solution filling channel 16 on the partition plate 122 may optimize the forming process of the battery 100.

With regard to a manner in which the electrolyte solution filling channel 16 is arranged, in an implementation, as shown in FIG. 3, one electrolyte solution filling channel 16 may be communicated with the accommodating cavity 14.

It is to be noted that, when the electrolyte solution filling channel 16 is only communicated with one accommodating cavity 14, the electrolyte solution filling channel 16 is to be provided on each partition plate 122. By forming openings and filling the electrolyte solution a number of times, each accommodating cavity 14 accommodating the electrode core assembly 13 can have an individual channel for filling the electrolyte solution. In this way, a shortest electrolyte solution filling path may be achieved, and the electrolyte solution can timely flow to the corresponding accommodating cavity 14 through the electrolyte solution filling channel 16, thereby ensuring that the electrolyte solution can timely and effectively infiltrate the electrode core assembly 13. In addition, a content of the electrolyte solution in each accommodating cavity 14 may be accurately controlled by arranging a number of electrolyte solution filling channels 16, so as to ensure the consistency of the electrolyte solution in the number of accommodating cavities 14.

Figure 6:
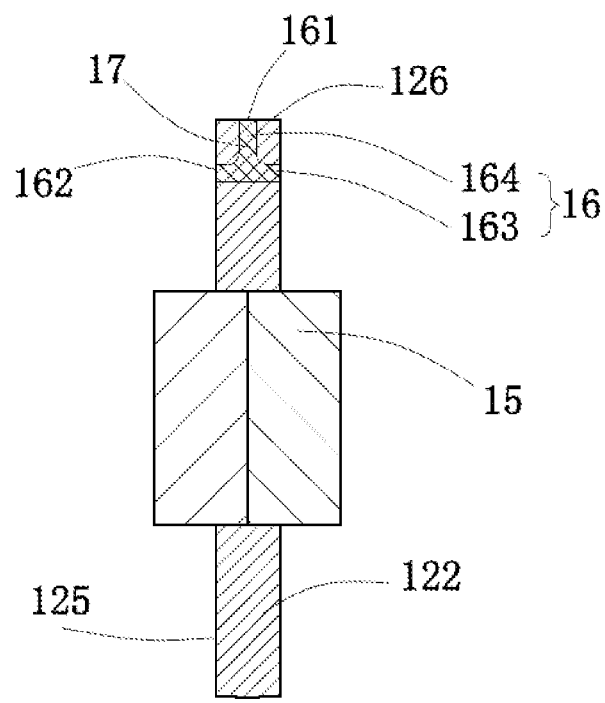
FIG. 6 is a schematic structural diagram of a partition plate provided with an electrolyte solution filling channel according to another embodiment of the present disclosure.

In another implementation, as shown in FIG. 6, the electrolyte solution filling channel 16 may be simultaneously communicated with the two adjacent accommodating cavities 14.

The electrolyte solution filling channel 16 includes a first channel 163 and a second channel 164. The first channel 163 extends through the partition plate 122 where the first channel is arranged, and is configured to communicate the two adjacent accommodating cavities 14 on two sides of the partition plate 122. The second channel 164 is configured to communicate the first channel 163 with the outside of the battery 100. That is to say, the circumferential surface 126 of the partition plate 122 is provided with one liquid inlet 161. The liquid outlet 162 is provided on both side surfaces 125 of the partition plate 122.

The battery 100 further includes a blocking member 17. The blocking member 17 is configured to seal the second channel 164 upon completion of filling the electrolyte solution, to block communication between the second channel 164 and the outside. The blocking member 17 is further configured to block at least partial area of the first channel 163, to block the communication between the two adjacent accommodating cavities 14 through the first channel 163.

It is to be noted that, when the accommodating cavities 14 on two sides of the partition plate 122 are simultaneously communicated through the electrolyte solution filling channel 16 on the partition plate 122, it is not necessary to provide the electrolyte solution filling channel 16 on each partition plate 122. The electrolyte solution filling channel 16 may be provided every other partition plate 122.

In this implementation, since the accommodating cavities 14 on the two sides of the partition plate 122 are at a relatively small distance from each other, the electrolyte solution may be simultaneously filled into the adjacent accommodating cavities 14 on the two sides of the partition plate 122 through the electrolyte solution filling channel 16 on the partition plate 122. Due to a relatively short infiltration path of the electrolyte solution, the electrolyte solution may still timely and effectively infiltrate the electrode core assemblies 13 on two sides.

In another implementation, a number of the electrolyte solution filling channels 16 on each partition plate 122 may be 1 or more.

Figure 7:
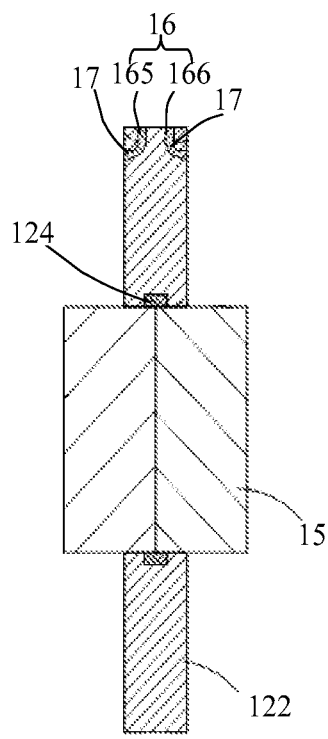
FIG. 7 is a schematic structural diagram of a partition plate provided with an electrolyte solution filling channel according to another embodiment of the present disclosure.

For example, as shown in FIG. 7, the electrolyte solution filling channel 16 includes a third channel 165 and a fourth channel 166 independent of each other. That is to say, two electrolyte solution filling channels 16 are provided on the partition plate 122. The third channel 165 is in communication with the accommodating cavity 14 on one side of the partition plate 122 where the third channel is arranged. The fourth channel 166 is in communication with the accommodating cavity 14 on another side of the partition plate 122 where the fourth channel is arranged.

In another implementation, each partition plate 122 is provided with the electrolyte solution filling channel 16. In this way, each accommodating cavity 14 corresponds to one electrolyte solution filling channel 16. Therefore, the amount of the electrolyte solution filled into each accommodating cavity 14 can be accurately controlled, thereby ensuring the consistency of the electrolyte solution.

Figure 8:
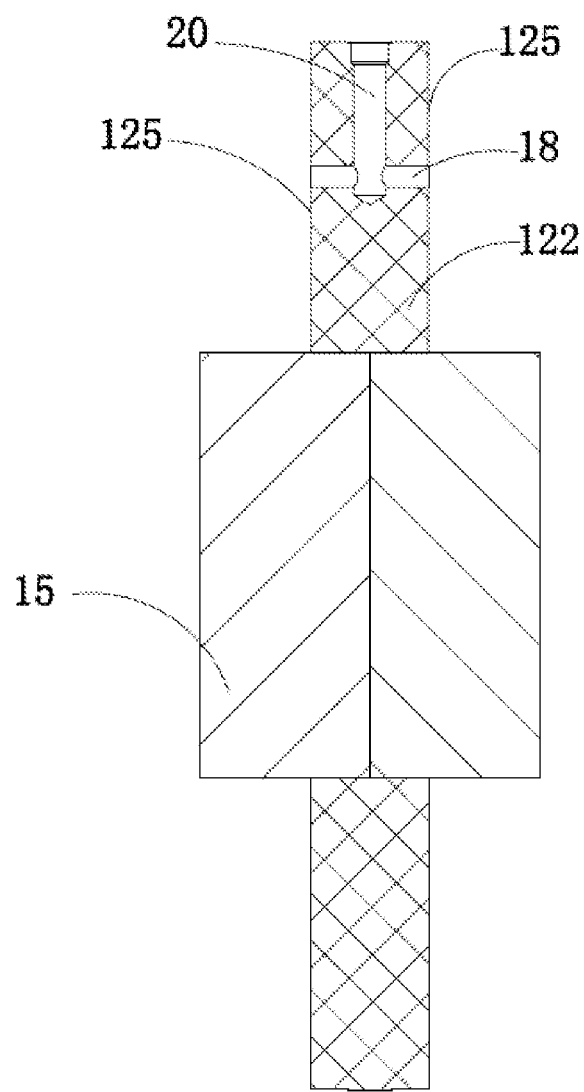
FIG. 8 is a schematic structural diagram of a partition plate provided with an electrolyte solution guide hole according to another embodiment of the present disclosure.

In an implementation, as shown in FIG. 8, at least one partition plate 122 is provided with an electrolyte solution guide hole 18. The electrolyte solution guide hole 18 is configured to communicate the two adjacent accommodating cavities 14 on the two sides of the partition plate 122 where the electrolyte solution guide hole is arranged. The electrolyte solution guide hole 18 extends through two opposite side surfaces 125 of the partition plate 122.

In some implementations, the electrolyte solution filling channel 16 and the electrolyte solution guide hole 18 are provided on different partition plates 122. One of the two adjacent partition plates 122 is provided with the electrolyte solution filling channel 16, and another one of the partition plates 122 is provided with the electrolyte solution guide hole 18.

In some implementations, the electrolyte solution filling channel 16 and the electrolyte solution guide hole 18 are provided on different partition plates 122. A portion of the number of partition plates 122 is provided with the electrolyte solution filling channel 16. The electrolyte solution filling channel 16 is in communication with the two adjacent accommodating cavities 14 on the two sides of the partition plate 122 where the electrolyte solution filling channel is arranged. Another portion of the partition plates 122 is provided with the electrolyte solution guide hole 18.

In some implementations, a portion of the number of partition plates 122 is provided with both the electrolyte solution filling channel 16 and the electrolyte solution guide hole 18 in communication with the electrolyte solution filling channel 16, and another portion of the partition plates 122 is provided with the electrolyte solution guide hole 18.

Figure 9:
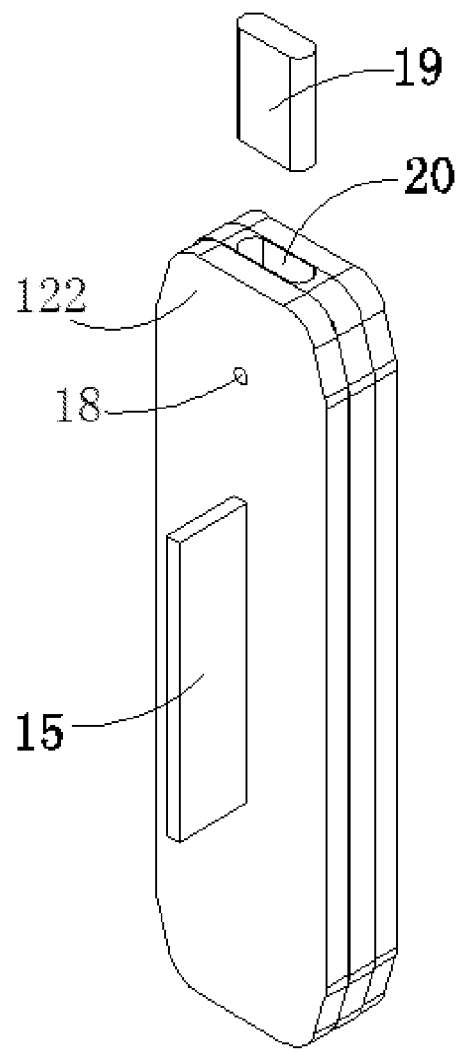
FIG. 9 is a schematic structural diagram of sealed mating between a sealing member and a sealing channel according to an embodiment of the present disclosure.

In an implementation, as shown in FIG. 9, the battery 100 further includes a sealing member 19. The sealing member 19 can block the electrolyte solution guide hole 18 upon completion of filling the electrolyte solution of the battery 100, to cause the electrolyte solution guide hole 18 to be in a closed state, so as to block the communication between the two adjacent accommodating cavities 14 through the electrolyte solution guide hole 18. That is to say, upon completion of filling the electrolyte solution, the sealing member 19 seals the electrolyte solution guide hole 18 to isolate the two adjacent accommodating cavities 14. In this way, the electrolyte solution does not flow between the adjacent accommodating cavities 14, so as not to affect each other, and the electrolyte solution is not decomposed due to the excessively large potential difference, thereby ensuring the safety and the service life of the battery 100.

Figure 10:
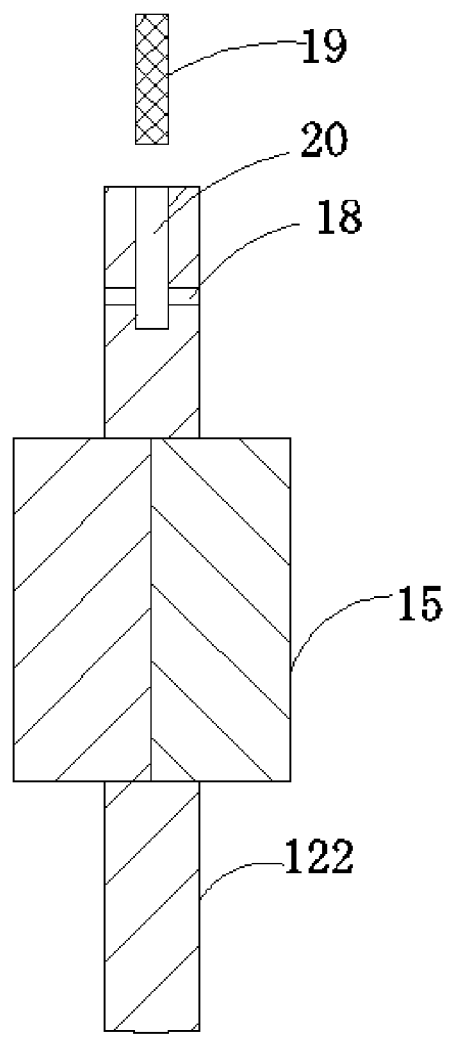
FIG. 10 is a cross-sectional view of the structure shown in FIG. 9.

In an implementation, as shown in FIG. 9 and FIG. 10, the circumferential surface 126 of the partition plate 122 is further provided with a sealing channel 20 communicated with the electrolyte solution guide hole 18 and extending through the electrolyte solution guide hole 18. The sealing member 19 can block the electrolyte solution guide hole 18 under the action of an external force.

In some implementations, the sealing member 19 is a sealing plug, and a shape of the sealing channel 20 is coupled with a shape of the sealing plug.

As shown in FIG. 9 and FIG. 10, the sealing member 19 is a cuboid structure. In an embodiment, the sealing member 19 may also be a cylindrical structure or a cylindrical structure having an elliptical cross-section. The shape of the sealing channel 20 may be flexibly configured according to the shape of the sealing member 19.

Figure 11:
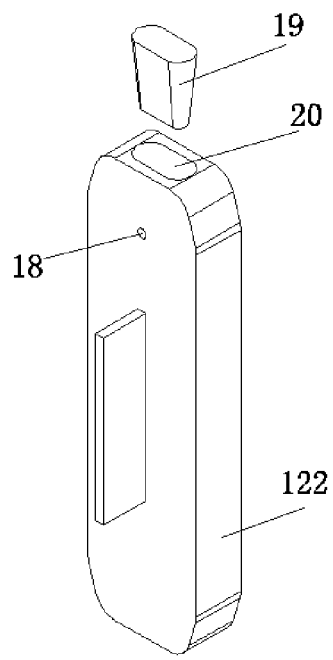
FIG. 11 is a schematic structural diagram of sealed mating between a sealing member and a sealing channel according to another embodiment of the present disclosure.
Figure 12:
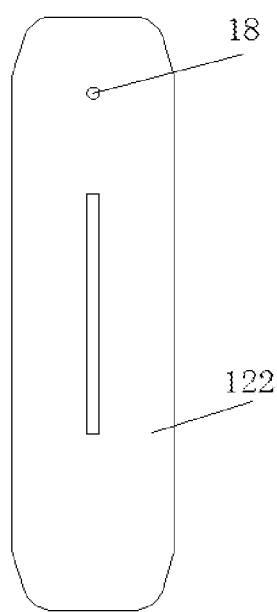
FIG. 12 is a front view of the structure shown in FIG. 11.
Figure 13:
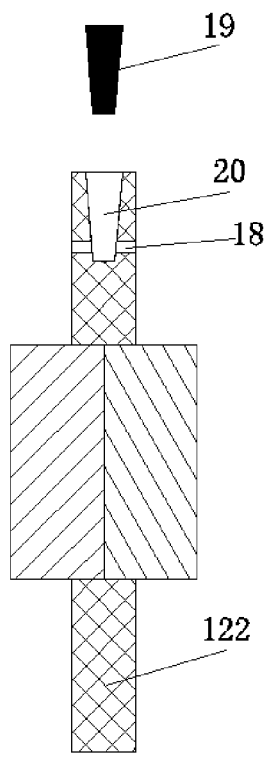
FIG. 13 is a cross-sectional view of the structure shown in FIG. 11.

In an embodiment, as shown in FIG. 11, FIG. 12, and FIG. 13, the sealing member 19 is a wedge-shaped block structure.

Figure 14:
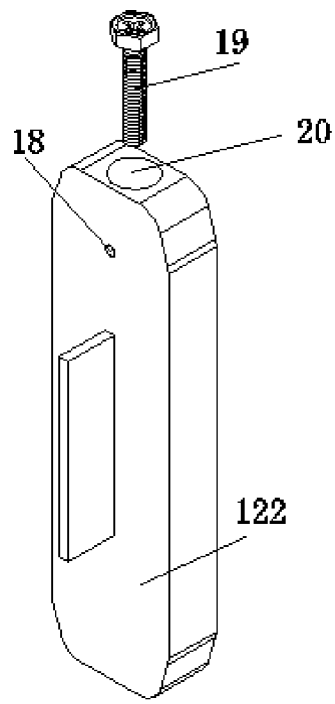
FIG. 14 is a schematic structural diagram of sealed mating between a sealing member and a sealing channel according to another embodiment of the present disclosure.
Figure 15:
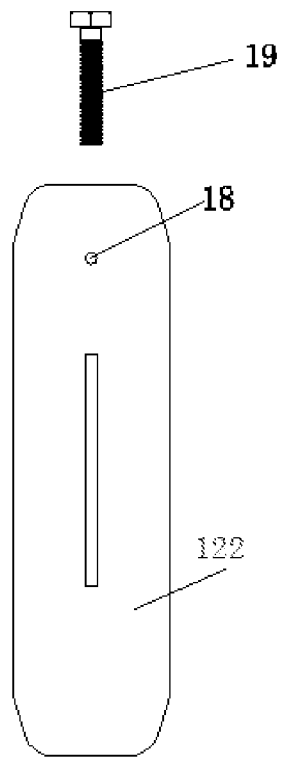
FIG. 15 is a front view of the structure shown in FIG. 14.
Figure 16:
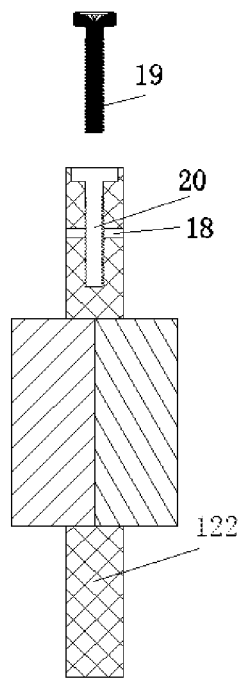
FIG. 16 is a cross-sectional view of the structure shown in FIG. 14.

In an embodiment, as shown in FIG. 14, FIG. 15, and FIG. 16, an inner wall of the sealing channel 20 is provided with threads. The sealing member 19 is a cylinder or a screw having a threaded surface.

Figure 17:
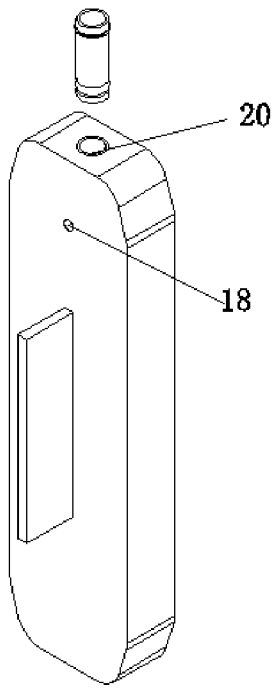
FIG. 17 is a schematic structural diagram of sealed mating between a sealing member and a sealing channel according to another embodiment of the present disclosure.
Figure 18:
FIG. 18 is a front view of the structure shown in FIG. 17.
Figure 18:
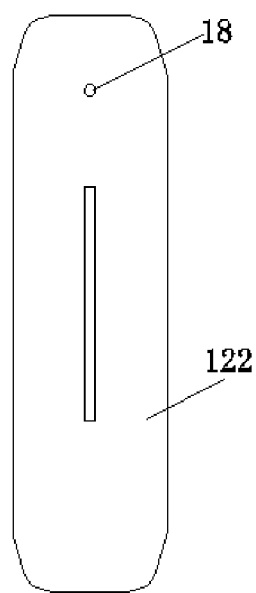
Figure 19:
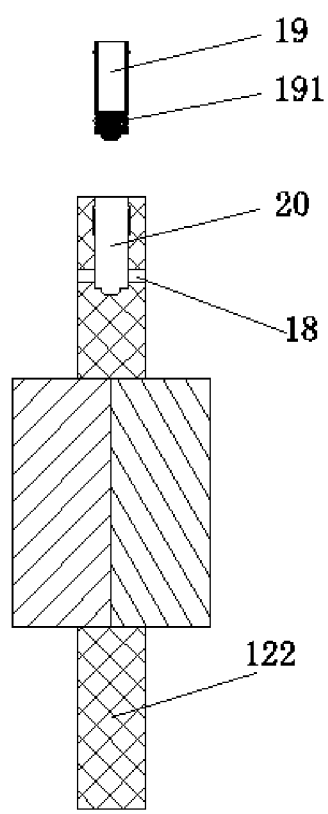
FIG. 19 is a cross-sectional view of the structure shown in FIG. 17.

In an embodiment, as shown in FIG. 17, FIG. 18, and FIG. 19, the sealing member 19 is a columnar structure, and an elastic sealing ring 191 is sleeved on a position corresponding to the electrolyte solution guide hole 18 in a sealed state.

Figure 20:
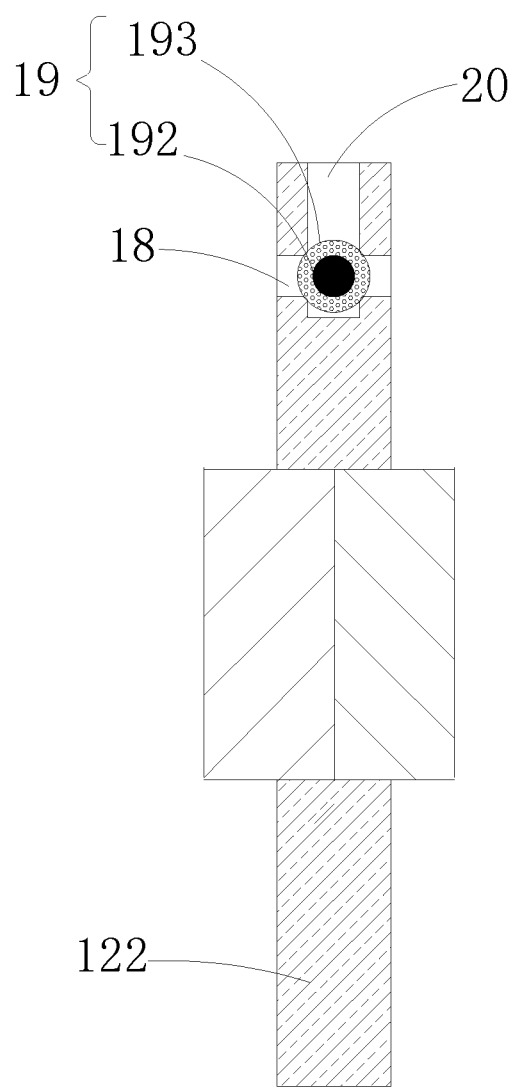
FIG. 20 is a schematic structural diagram of sealed mating between a sealing member and a sealing channel according to another embodiment of the present disclosure.

In some implementations, as shown in FIG. 20, the sealing member 19 is a sealing ball, and includes a metal ball 192 and a sealing sleeve 193 wrapped around an outer surface of the metal ball. The sealing ball is arranged in the sealing channel 20 by means of interference fit.

In some implementations, before the electrolyte solution filling, during the electrolyte solution filling, or during formation of the battery 100 after the electrolyte solution filling, the sealing member 19 is in a first situation, and the electrolyte solution guide hole 18 is in an open state to communicate the two adjacent accommodating cavities 14 on two sides of the partition plate 122 where the electrolyte solution guide hole is arranged. After the electrolyte solution filling or during formation of the battery 100 after the electrolyte solution filling, the sealing member 19 is switched from the first situation to a second situation. The sealing member 19 blocks the electrolyte solution guide hole 18 to cause the electrolyte solution guide hole 18 to be in the closed state, so as to block the communication between the two adjacent accommodating cavities 14 through the electrolyte solution guide hole 18. The sealing member 19 is switchable between the first situation and the second situation.

A first position and a second position are formed in the sealing channel 20. The sealing member 19 is movable between the first position and the second position by the external force. The first situation is that the sealing member 19 is arranged at the first position. The second situation is that the sealing member 19 is arranged at the second position. The external force is selected from one or more of gravity, an electromagnetic force, an inertial force, or a thermal force.

Referring to FIG. 2 and FIG. 3 again, in the present disclosure, each electrode core assembly 13 includes a first electrode lead-out member 131 and a second electrode lead-out member 132 that are configured to lead out currents. In this implementation, the first electrode lead-out member 131 and the second electrode lead-out member 132 are respectively arranged on two opposite sides of the electrode core assembly 13 along the first direction.

According to the present disclosure, all of the housings 11 and all of the electrode core assemblies 13 are arranged along the first direction, and the first electrode lead-out member 131 and the second electrode lead-out member 132 of the electrode core assembly 13 are respectively arranged on the two opposite sides of the electrode core assembly 13 along the first direction. That is to say, a "head to head" arrangement mode is adopted between the electrode core assemblies 13. The arrangement mode can conveniently realize series connection between the two adjacent electrode core assemblies 13 in the battery 100, and the connection structure is simple. In addition, the battery 100 having a relatively large length may be conveniently manufactured by using the arrangement mode.

Generally, each electrode core assembly 13 includes a first electrode lead-out member 131 and a second electrode lead-out member 132 that are configured to lead out currents. If the electrode core assembly 13 includes only one electrode core, the first electrode lead-out member 131 and the second electrode lead-out member 132 may be respectively a positive tab and a negative tab of the electrode core, or respectively the negative tab and the positive tab. If the electrode core assembly 13 includes a number of electrode cores, the first electrode lead-out member may be a lead-out member formed by combining and soldering the positive tabs. The second electrode lead-out member may be a lead-out member formed by combining and soldering the negative tabs. Alternatively, the first electrode lead-out member may be a lead-out member formed by combining and soldering the negative tabs. The second electrode lead-out member may be a lead-out member formed by combining and soldering the positive tabs. "First" and "second" in the first electrode lead-out member 131 and the second electrode lead-out member 132 are merely used for name distinction, and not for limiting numbers. For example, there may be one or more first electrode lead-out members.

The series connection mode provided in this implementation may be series connection between the adjacent electrode core assemblies 13. An implementation may be that current lead-out members on the adjacent electrode core assemblies 13 are directly connected or may be electrically connected by using an extra conductive component. That is to say, the electrode core assemblies 13 in the two adjacent accommodating cavities 14 may be directly or indirectly electrically connected.

In an implementation, the battery 100 further includes an electrode core connector 15. The electrode core connector 15 extends through the partition plate 122. For example, a through connecting hole 123 is provided on the partition plate 122. The electrode core connector 15 extends through the through connecting hole 123. That is to say, the electrode core connector 15 penetrates from one side to another side of the through connecting hole 123.

In an implementation, the first electrode lead-out member 131 of one of the electrode core assemblies 13 in the two adjacent accommodating cavities 14 is electrically connected with the second electrode lead-out member 132 of another one of the electrode core assemblies 13 by using the electrode core connector 15. That is to say, the electrode core assemblies 13 in the two adjacent accommodating cavities 14 are indirectly connected.

In an implementation, the two adjacent electrode core assemblies 13 are connected by the electrode core connector 15, so as to provide a larger design space for the electrode core connector 15, increase a flow area, and reduce the internal resistance of the battery 100.

In some implementations, the electrode core connector 15 may be a sheet structure. In some implementations, the electrode core connector 15 may be a columnar structure.

The first electrode lead-out member 131 and the second electrode lead-out member 132 may be directly soldered to the electrode core connector 15 in the corresponding partition plate 122. Compared with the series connection between the existing cells, soldering procedures and steps are simplified, the risk caused by poor soldering is reduced, and the overall safety and reliability of the battery are enhanced.

As shown in FIG. 3, the electrode core connector 15 includes a copper connection piece 151 and an aluminum connection piece 152 that are electrically connected with each other. Since a difference exists between a potential of copper and a potential of lithium and between a potential of aluminum and the potential of lithium, corrosion easily occurs if a junction of the copper connection piece 151 and the aluminum connection piece 152 are in contact with the electrolyte solution. In an implementation, a position where the copper connection piece 151 is electrically connected with the aluminum connection piece 152 is arranged inside the partition plate 122.

In order to prevent, from being corroded by the electrolyte solution, the position where the copper connection piece 151 is electrically connected with the aluminum connection piece 152, and in order to isolate the accommodating cavities 14 on two sides of the partition plate 122 to block interpenetration of the electrolyte solution in the accommodating cavities 14 on the two sides of the partition plate 122, in some embodiments, as shown in FIG. 7, the battery 100 further includes a packaging structure 124 arranged in the through connecting hole 123. The packaging structure 124 is configured to package the electrode core connector 15 in the through connecting hole 123. In addition, the packaging structure 124 can seal the through connecting hole 123. In this way, a position where the copper connection piece 151 is in contact with the aluminum connection piece 152 is sealed inside the partition plate 122, to prevent the position from being exposed to an internal space of the battery 100, especially prevent the position from being in contact with the electrolyte solution, so as to prevent, from being corroded, the position where the copper connection piece is connected with the aluminum connection piece.

In the present disclosure, the packaging structure 124 is only required to have the sealing function, be resistant to electrolyte solution corrosion, and be insulated. For example, the packaging structure may be a rubber stopper.

In the mounting solution using the electrode core connector 15 provided in the above embodiments, a second packaging is required to be performed on the through connecting hole 123, which is not convenient to operate. In addition, during the second packaging, selected materials used for the packaging structure 124 are complex, and may affect the electrolyte solution inside the battery 100. In view of this, in another embodiment, as shown in FIG. 3 and FIG. 6, a solution of integrally forming the electrode core connector 15 and the partition plate 122 by means of injection molding is provided. In the solution, the electrode core connector 15 and the partition plate 122 are integrally formed by means of the injection molding. The electrode core connector 15 is first manufactured, and then the partition plate 122 is formed outside the electrode core connector 15 by means of the injection molding. In order to better achieve a sealing effect of the partition plate 122, during the integral injection molding, a section where plastic is in contact with metal is formed by using an EPI molding technology. For example, a nano-plastic layer is sintered with a metal surface, such as PPE, PPS, and the like, and then integral injection molding is performed on a plastic member. By using the method, the metal layer and the plastic layer can be bonded together more effectively, thereby improving the sealing performance of the entire structural component. During the assembly, the electrode core assembly 13 and the electrode core connector 15 are directly connected without needing to seal through holes, thereby reducing the risk while simplifying the process.

In yet another implementation, the first electrode lead-out member 131 of one of the electrode core assemblies 13 in the two adjacent accommodating cavities 14 may be electrically connected with the second electrode lead-out member 132 of another one of the electrode core assemblies 13. The junction of the first electrode lead-out member 131 and the second electrode lead-out member is arranged in the partition plate 122 between the two electrode core assemblies 13. That is to say, the first electrode lead-out member 131 and the second electrode lead-out member 132 are directly electrically connected. The junction of the first electrode lead-out member 131 and the second electrode lead-out member 132 is a position where the first electrode lead-out member 131 and the second electrode lead-out member 132 are connected with each other.

Similar to the foregoing implementation, in order to facilitate the electrical connection between the first electrode lead-out member 131 and the second electrode lead-out member 132, the through connecting hole is provided on the partition plate 122. The junction of the first electrode lead-out member 131 and the second electrode lead-out member 132 is arranged in the through connecting hole of the partition plate 122 between the two electrode core assemblies 13.

In order to block interpenetration of the electrolyte solution in the accommodating cavities 14 of the electrode core assemblies 13 on the two sides of the partition plate 122, the battery 100 further includes the packaging structure arranged in the through connecting hole. The packaging structure is configured to package the junction in the through connecting hole, and seals the through connecting hole. In this way, the first electrode lead-out member and the second electrode lead-out member are sealed to the partition plate 122, to prevent movement of the electrolyte solution in the two adjacent electrode core assemblies 13 on the two sides of the partition plate 122.

In this implementation, since the two adjacent housings 11 share one partition plate 122, a spacing between the two electrode core assemblies 13 is greatly reduced. Compared with the connection between two batteries 100 and an external power connector by using the first electrode lead-out member 131 and the second electrode lead-out member 132 in related arts, the subsequent assembling process of the battery pack is simplified. In addition, the material usage is reduced, and the weight is reduced.

In the present disclosure, the battery 100 may further include other structures, such as an explosion-proof valve, a current interrupt device, and the like. For the other structures, reference may be made to general settings in related arts, and the details are not described herein again.

Figure 23:
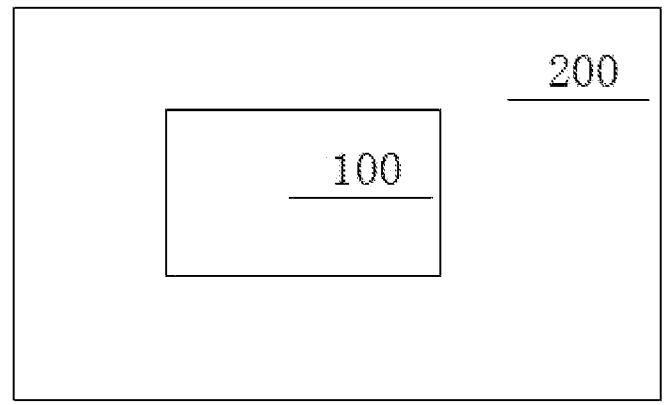
FIG. 23 is a schematic structural diagram of a battery module according to an embodiment of the present disclosure.

As shown in FIG. 23, the present disclosure further provides a battery module. The battery module includes the battery 100 according to any of the above embodiments. By using the battery module provided in the present disclosure, fewer assembling processes are required, and costs are relatively low.

Figure 21:
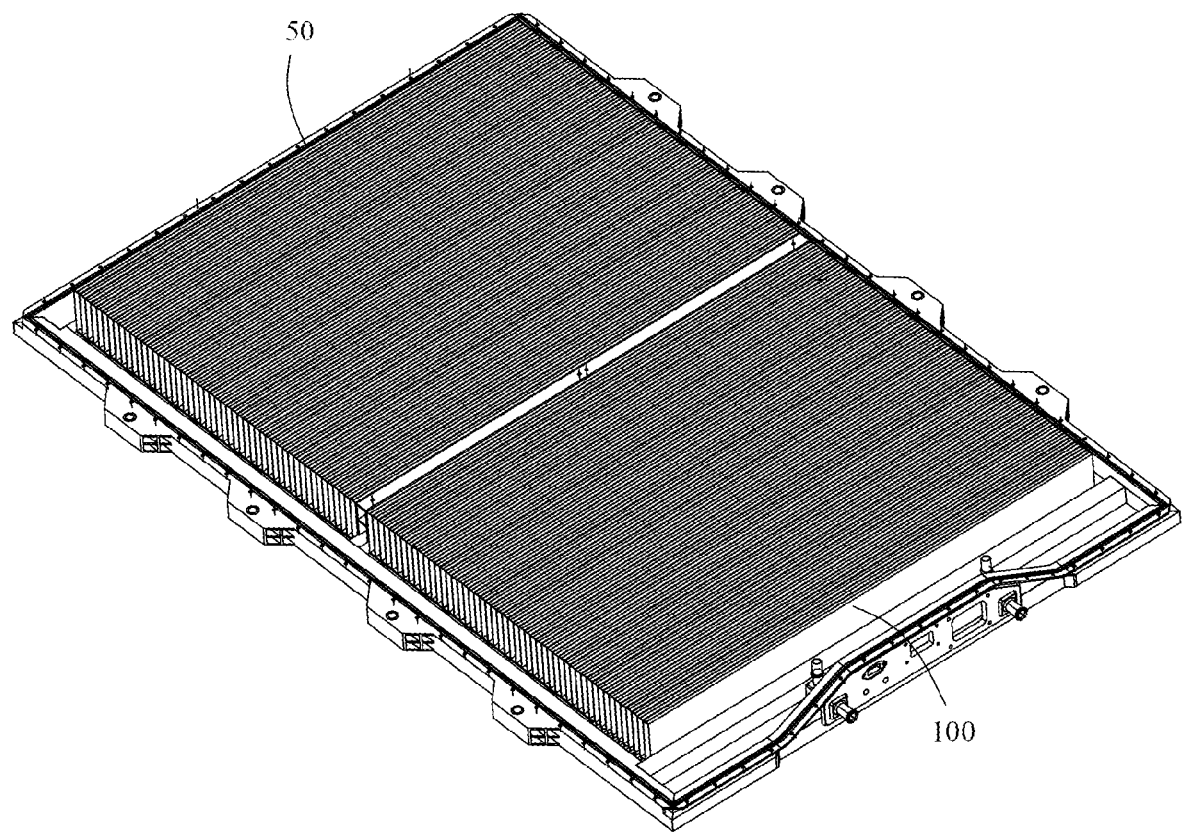
FIG. 21 is a schematic structural diagram of a battery pack according to an embodiment of the present disclosure.
Figure 22:
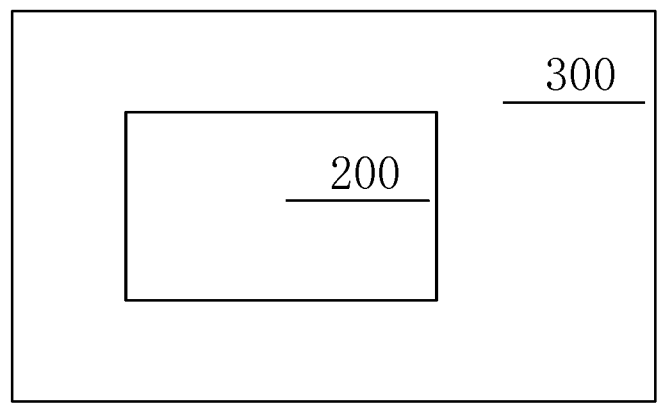
FIG. 22 is a schematic structural diagram of a battery pack according to another embodiment of the present disclosure.
Figure 24:
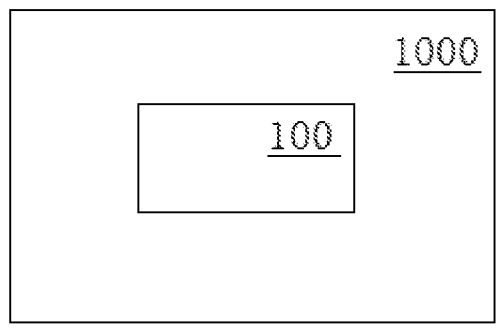
FIG. 24 is a schematic structural diagram of an electric vehicle according to an embodiment of the present disclosure.
Figure 25:
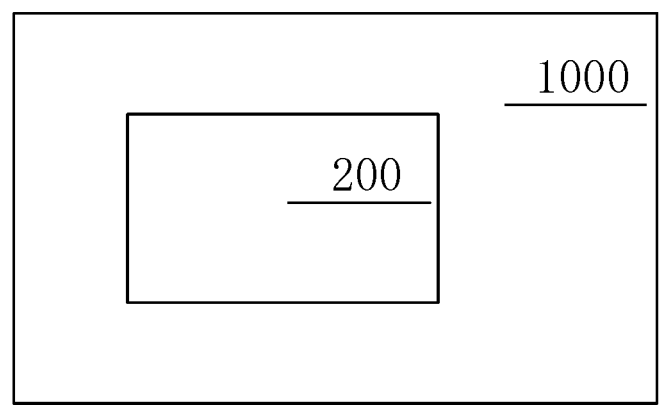
FIG. 25 is a schematic structural diagram of an electric vehicle according to another embodiment of the present disclosure.
Figure 26:
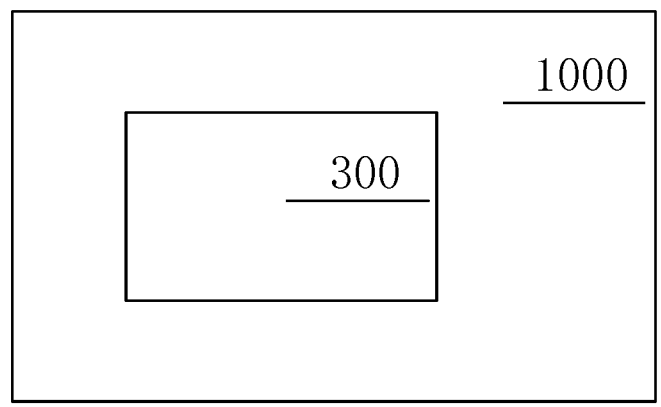
FIG. 26 is a schematic structural diagram of an electric vehicle according to another embodiment of the present disclosure.

As shown in FIG. 21 and FIG. 22, the present disclosure further provides a battery pack 300, including a pallet 50 and the battery 100 or the battery module 200 according to any of the above embodiments. The battery 100 or the battery module 200 is arranged inside the pallet 50. By using the battery pack provided in the present disclosure, fewer assembling processes are required, costs are relatively low, and energy density is high. As shown in FIG. 24 and FIG. 26, the present disclosure further provides an electric vehicle 1000 using the above battery pack as a power source, including the battery 100, the battery module 200, or the battery pack 300. The electric vehicle 1000 can have a high endurance capacity and relatively low costs by using the battery pack 300 provided in the present disclosure.

In the description of the present disclosure, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. A person of ordinary skill in the art may understand the specific meanings of the foregoing terms in the present disclosure according to specific situations.

In description of this specification, description of reference terms such as "an embodiment", "specific embodiments", or "an example", means including specific features, structures, materials, or features described in the embodiment or example in at least one embodiment or example of the present disclosure. In this specification, schematic descriptions of the foregoing terms do not necessarily point at a same embodiment or example. In addition, the described specific features, structures, materials, or characteristics may be combined in a proper manner in any one or more of the embodiments or examples.

The embodiments of the present disclosure have been shown and described. Persons of ordinary skill in the art should understand that various changes, modifications, replacements and variations may be made to the embodiments without departing from the principles and spirit of the present disclosure, and the scope of the present disclosure is as defined by the appended claims and their equivalents.

What is claimed is:

1. A battery, comprising a housing, at least one end cover, partition plates, and a plurality of electrode core assemblies; wherein the at least one end cover is arranged on at least one of two opposite ends of the housing for sealing an internal space of the housing;

the partition plates are spaced apart from each other in the housing for dividing the internal space of the housing into a plurality of accommodating cavities arranged along a first direction;

each of the electrode core assemblies is arranged in one of the accommodating cavities; and the plurality of electrode core assemblies are arranged along the first direction and connected in series;

each of the partition plates comprises an electrolyte solution filling channel; the electrolyte solution filling channel is in communication with an accommodating cavity of the accommodating cavities on at least one side of the partition plate, and is configured for filling electrolyte solution into the accommodating cavity from an outside of the battery; the electrolyte solution filling channel is in a closed state upon completion of filling the electrolyte solution to prevent communication between the accommodating cavity and the outside of the battery;

a through hole is provided at a position of the housing corresponding to the electrolyte solution filling channel on the partition plate; and the through hole of the housing is configured to communicate the electrolyte solution filling channel with the outside of the battery.

2. The battery according to claim 1, wherein the housing is an integrated structure extending along the first direction; each of the partition plates comprises side surfaces facing adjacent electrode core assemblies and circumferential surfaces connected with the side surfaces; the circumferential surfaces of each of the partition plates are coupled with an interior surface of the housing to divide the internal space of the housing into the plurality of accommodating cavities; the at least one end cover comprises two end covers;

an accommodating cavity among the plurality of accommodating cavities arranged in the middle of the battery in the first direction are surrounded by two adjacent partition plates and a portion of the housing arranged between the two adjacent partition plates; and an accommodating cavity among the plurality of accommodating cavities arranged on each of two ends of the battery in the first direction are surrounded by a partition plate and one of the two end covers and a portion of the housing arranged between the partition plate and the one of the two end covers.

3. The battery according to claim 1 or 2, wherein the housing is an integrated structure extending along the first direction; each of the partition plates comprises side surfaces facing adjacent electrode core assemblies and circumferential surfaces connected with the side surfaces;

the battery further comprises a separator film arranged in the housing; the partition plates are spaced apart from each other in a space formed by the separator film; the circumferential surfaces of the partition plates are coupled with the separator film to divide an internal space of the separator film into the plurality of accommodating cavities; the at least one end cover comprises two end covers;

an accommodating cavity among the plurality of accommodating cavities arranged in the middle of the battery in the first direction are surrounded by two adjacent partition plates and a portion of the separator film arranged between the two adjacent partition plates; and an accommodating cavity among the plurality of accommodating cavities arranged on each of two ends of the battery in the first direction are surrounded by a partition plate and one of the two end covers and a portion of the separator film arranged between the partition plate and the one of the two end covers;

the separator film comprises a through hole at a position corresponding to an electrolyte solution filling channel on one of the partition plates; and the through hole of the separator film is configured to communicate the electrolyte solution filling channel with the outside of the battery.

4. The battery according to claim 1, wherein
the housing is an integrated structure extending along the first direction;
the battery further comprises a separator film arranged in the housing; the at least one end cover comprises two end covers; the separator film comprises a plurality of sub-separator films arranged along the first direction and in a one-to-one correspondence with the plurality of accommodating cavities; two opposite ends of each of the sub-separator films are coupled with partition plates on two ends of a corresponding accommodating cavity, or one of the partition plates is coupled with one of the two end covers to form a corresponding accommodating cavity; and two adjacent accommodating cavities share one of the partition plates;
an accommodating cavity among the plurality of accommodating cavities arranged in the middle of the battery in the first direction are surrounded by a corresponding sub-separator film and two partition plates arranged on end portions of the corresponding sub-separator film; and an accommodating cavity among the plurality of accommodating cavities arranged on each of two ends of the battery in the first direction are surrounded by a corresponding sub-separator film, a partition plate, and one of the two end covers that are arranged on the end portions of the corresponding sub-separator film.

5. The battery according to claim 1, wherein the electrolyte solution filling channel comprises a first channel and a second channel; the first channel extends through the partition plate where the first channel is arranged, and is configured to communicate two adjacent accommodating cavities on two sides of the partition plate; and the second channel is configured to communicate the first channel with the outside of the battery.

6. The battery according to claim 5, further comprising a blocking member, wherein the blocking member is configured to seal the second channel upon completion of filling the electrolyte solution, to block communication between the second channel and the outside of the battery.

7. The battery according to claim 5, further comprising a blocking member, wherein the blocking member is configured to block at least a part of the first channel, to block the communication between the two adjacent accommodating cavities.

8. The battery according to claim 1, wherein the electrolyte solution filling channel comprises a third channel and a fourth channel that are independent from each other; the third channel is in communication with an accommodating cavity on a first side of a partition plate where the third channel is arranged; and the fourth channel is in communication with an accommodating cavity on a second side of the partition plate where the fourth channel is arranged.

9. The battery according to claim 1, wherein at least one of the partition plates is provided with an electrolyte solution guide hole; and the electrolyte solution guide hole is configured to communicate two adjacent accommodating cavities on two sides of the partition plate where the electrolyte solution guide hole is arranged.

10. The battery according to claim 9, wherein
the electrolyte solution filling channel and the electrolyte solution guide hole are provided on different partition plates; one of two adjacent partition plates is provided with the electrolyte solution filling channel; and another one of the two adjacent partition plates is provided with the electrolyte solution guide hole; or
the electrolyte solution filling channel and the electrolyte solution guide hole are provided on different partition plates; each of a first group of the partition plates is provided with the electrolyte solution filling channel; the electrolyte solution filling channel is in communication with the two adjacent accommodating cavities on two sides of a partition plate where the electrolyte solution filling channel is arranged; and each of a second group of the partition plates is provided with the electrolyte solution guide hole, and the first group is different than the second group; or
each of a first group of the partition plates is provided with the electrolyte solution filling channel and a first electrolyte solution guide hole is in communication with the electrolyte solution filling channel; and each of a second group of the partition plates is provided with a second electrolyte solution guide hole, and the first group is different than the second group.

11. The battery according to claim 1, wherein the electrolyte solution filling channel comprises a liquid inlet and a liquid outlet at two ends of the electrolyte solution filling channel, respectively; the electrolyte solution is filled into the electrolyte solution filling channel through the liquid inlet, and is filled into a corresponding accommodating cavity communicated with the electrolyte solution filling channel through the liquid outlet; and
a protrusion protrudes outward from the partition plate where the electrolyte solution filling channel is arranged on; and the liquid inlet is arranged on the protrusion.

12. The battery according to claim 9, further comprising a sealing member, wherein the sealing member is configured to cause the electrolyte solution guide hole to be in a closed state upon completion of filling the electrolyte solution, to block the communication between the two adjacent accommodating cavities through the electrolyte solution guide hole.

13. The battery according to claim 12, wherein
each of the partition plates comprises side surfaces facing adjacent electrode core assemblies and circumferential surfaces connected with the side surfaces;
the electrolyte solution guide hole extends through two opposite side surfaces of the partition plate; and
at least one of the circumferential surfaces of the partition plate is further provided with a sealing channel communicated with the electrolyte solution guide hole and extending through the electrolyte solution guide hole; and the sealing member is configured to enter the electrolyte solution guide hole through the sealing channel, to block the electrolyte solution guide hole.

14. The battery according to claim 13, wherein the sealing member comprises a sealing plug; and a shape of the sealing channel matches a shape of the sealing plug.

15. The battery according to claim 14, wherein
the sealing member is a cuboid structure, a cylindrical structure, a cylindrical structure having an elliptical cross-section, or a wedge-shaped block structure; or
an inner wall of the sealing channel is provided with threads; and the sealing plug is a cylinder or a screw having a threaded surface; or the sealing member is a columnar structure; and an elastic sealing ring is sleeved on a position of the sealing member corresponding to the electrolyte solution guide hole.

16. The battery according to claim 13, wherein the sealing member comprises a sealing ball, and the sealing ball comprises a metal ball and a sealing sleeve wrapped around an outer surface of the metal ball.

17. The battery according to claim 12, wherein
before filling the electrolyte solution, during filling the electrolyte solution, or during formation of the battery after filling the electrolyte solution, the electrolyte solution guide hole is in an open state to communicate the two adjacent accommodating cavities on two sides of the partition plate where the electrolyte solution guide hole is arranged;
after filling the electrolyte solution, the sealing member blocks the electrolyte solution guide hole to cause the electrolyte solution guide hole to be in the closed state, to block the communication between the two adjacent accommodating cavities through the electrolyte solution guide hole.

18. The battery according to claim 13, wherein
the sealing member is movable between a first position and a second position in the sealing channel.

19. A battery pack, comprising the battery according to claim 1.

20. An electric vehicle, comprising the battery according to claim 1.

* * * * *